United States Patent [19]

Obara et al.

[11] Patent Number: 4,495,236

[45] Date of Patent: Jan. 22, 1985

[54] PRESSURE-SENSITIVE ELECTRICALLY CONDUCTIVE COMPOSITE SHEET

[75] Inventors: Masaaki Obara, Atsugi; Yoshio Tajima, Ito; Yukiji Suzuki, Hiratsuka, all of Japan

[73] Assignee: The Yokohama Rubber Co. Ltd., Tokyo, Japan

[21] Appl. No.: 555,972

[22] Filed: Nov. 29, 1983

[30] Foreign Application Priority Data

Nov. 29, 1982 [JP] Japan .............................. 57-207649

[51] Int. Cl.³ .......................... B32B 3/10; H01B 1/00

[52] U.S. Cl. .................................. 428/172; 252/500; 428/195; 428/323; 428/332; 428/913

[58] Field of Search ............... 428/143, 156, 195, 323, 428/332, 172, 931; 252/500

[56] References Cited

U.S. PATENT DOCUMENTS 4,098,945 7/1978 Oehmke ............................ 428/323

*Primary Examiner*—Paul J. Thibodeau

*Attorney, Agent, or Firm*—Finnegan, Henderson, Farabow, Garrett & Dunner

[57] ABSTRACT

The invention is concerned with a pressure-sensitive, electrically conductive composite sheet which enables a free selection of the pressure sensitivity, and which exhibits a large change in resistance upon compression. The sheet comprises an electrically conductive elastomer sheet obtained by blending an elastic high-molecular material with electrically conductive particles, and forming a dot pattern over at least one surface of the electrically conductive elastomer sheet, the dot pattern being composed of an electrically insulating material and having a form that satisfies the following requirements:

| | |
|---|---|
| Diameter of dots | R = 0.3 to 1.5 mm |
| Thickness of dots | d = 0.01 to 0.10 mm |
| Distance between centers of neighboring dots | l = (0.1 to 3.0) + R |

1 Claim, 11 Drawing Figures

PRESSURE-SENSITIVE ELECTRICALLY CONDUCTIVE COMPOSITE SHEET

BACKGROUND OF THE INVENTION

1. Field of the Invention

The present invention relates to a pressure-sensitive, electrically conductive composite sheet, and more particularly to a pressure-sensitive, electrically conductive composite sheet in which a barrier layer does not slip, the pressure sensitivity can be selected as required, and which exhibits a large change in resistance upon compression.

2. Description of the Prior Art:

Electrically conductive elastomers obtained by dispersing electrically conductive elastomers obtained by dispersing electrically conductive particles in elastic, high molecular weight materials are used conventionally for electronic parts such as rubber switches. When such an electrically conductive elastomer is placed directly onto the surface of an electrode, however, an electric current flows when the electrically conductive elastomer is simply touched, making it difficult to obtain the switching function. Therefore a thin electrically insulating porous film is usually inserted between the electrically conductive elastomer and the electrode so that, when the electrically conductive elastomer is locally compressed, it protrudes through pores in the film over the area in which the pressure is exerted, and comes into contact with the electrode to form a circuit and provide the switching function.

However, this pressure-sensitive, electrically conductive mechanism utilizing a porous film has the following defects.

(a) During assembly, if the porous film slips even slightly, the circuit is not formed when the electrically conductive elastomer is compressed; i.e., it fails to exhibit its switching function. Further, when a porous film is employed, the through holes in it must be in agreement with the positions of the contacts of the key board, as disclosed in Japanese Patent Laid-Open No. 74875/1977.

(b) The porous film is often attached to the electrode by an adhesive so that it will not slip, but the surface of the pores could be covered by the adhesive, which would impair the electrical conductivity. Or else, the porous film could be attached in the wrong position, which would require laborious work in a subsequent step for correction.

To remove these defects, an electrically conductive composite sheet has been proposed in which an electrically nonconductive woven fabric is provided on one surface of an electrically conductive sheet, as disclosed in Japanese Patent Laid-Open No. 124650/1980. It is, however, difficult to precisely maintain the distance between the electrode and the woven fabric, or the sheet containing the woven fabric, and satisfactory pressure-sensitive characteristics are not necessarily obtained.

There are also methods according to which reduced quantities of electrically conductive particles are added, or the distance between the electrically conductive particles is increased by the application of an external mechanical force, to impart a pressure-sensitive property. A sheet obtained by such a method, however, exhibits only a small change in resistance upon compression, so that it requires a large compression force, and thus is not suitable for use as a switching element.

Japanese Patent Laid-Open No. 147772/1978 discloses a method of imparting pressure sensitivity by subjecting an electrically conductive magnetic material to the action of a magnetic field, so that the resultant magnetic properties are distributed nonuniformly. This method, however, requires a special manufacturing method and complicated molding steps, and a sheet obtained by this method does not necessarily have a satisfactory durability.

A sheet has also been proposed according to which protuberances made of an electrically insulating material are formed integrally on a plastic sheet which is coated with electrically conductive paint. The electrically conductive composite sheet of this construction, however, has the following defects, and does not exhibit satisfactory pressure-sensitive characteristics.

(1) The electirc current does not flow in the depthwise direction of the sheet, but only in the lengthwise direction of the sheet. Therefore, limitations are imposed on such electrodes.

(2) The sheet does not exhibit elasticity but has a large stiffness. Therefore, the sheet does provide a uniform surface contact upon compression so that variations in the pressure-sensitive characteristics depend upon the position at which it is pressed.

SUMMARY OF THE INVENTION

In order to eliminate the defects inherent in the conventional art, the inventors of the present invention have conducted an intensive study, resulting in the present invention.

The object of the present invention is to provide a pressure-sensitive, electrically conductive composite sheet in which a barrier layer does not slip, the pressure sensitivity can be selected as required, and which exhibits a large change in resistance upon compression.

The gist of the present invention resides in a pressure-sensitive, electrically conductive composite sheet which comprises an electrically conductive elastomer sheet obtained by dispersing electrically conductive particles in an elastomeric high-molecular weight material, and forming a dot pattern integrally on at least one surface of the electrically conductive elastomer sheet, the dot pattern being made of an electrically insulating material and having a form that satisfies the following requirements:

| | |
|---|---|
| Diameter of dots (dot diameter) | R = 0.3 to 1.5 mm |
| Thickness of dots | d = 0.01 to 0.10 mm |
| Distance between centers of neighboring dots (pitch) | l = (0.1 to 3.0) + R |

BRIEF DESCRIPTION OF THE DRAWINGS

FIGS. 1 to 4 illustrate embodiments according to the present invention, wherein:

FIG. 1(*a*) is a plan view of dots according to one embodiment of the present invention;

FIG. 1(*b*) is a side view thereof;

FIG. 2(*a*) is a plan view of dots according to another embodiment of the present invention;

FIG. 2(*b*) is a side view thereof;

FIGS. 3 and 4 are plan views of different dot patterns; and

DESCRIPTIONS OF THE PREFERRED EMBODIMENTS

Figure 1:
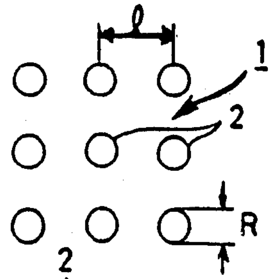
Figure 1:
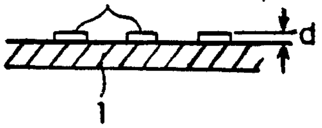

In the present invention, the elastic high-molecular weight material is one of natural rubber, a variety of synthetic rubbers such as SBR, BR, IR, EPDM, EPM, urethane rubber, silicone rubber, and NBR, or any of a variety of thermoplastic elastomers of the polyolefin, polyester, or polyurethane type; which may be used either alone or in the form of a mixture of two or more thereof, or a copolymer thereof; and which may, as required, be blended with a plasticizer, a stabilizer, an antioxidant, a lubricant, a coloring agent, an extender, a reinforcement filler, and a coupling agent for metal; and which may also be blended, as required, with a curing agent of a non-sulfur or non-sulfurous compound type, an actinator, and a stiffening agent. Among these elastic high-molecular materials, silicone rubber is particularly preferable because of its electric properties and chemical stability, i.e., because of its excellent resistance to chemicals and heat.

Examples of the electrically conductive particles include metal particles such as those of silver, copper, cobalt, nickel, iron, chromium, titanium, platinum, gold, aluminium, and zinc, as well as particles onto which a metal is plated; or particles of carbonaceous compounds such as carbon black, graphite, tungsten carbide, and the like, or carbides of metals, Of these, carbonaceous compounds are preferable because of their excellent physical and chemical stability. In particular, graphite and carbon black are suitable for producing a presure-sensitive electrically conductive composite sheet because of their excellent durability, light weight, and advantageous cost. Metal particles exhibit a sufficiently large change in resistance upon compression, but are not advantageous because they cannot be reinforced, and the surfaces of the particles tend to oxidize. The electrically conductive particles are usually uniformly dispersed at a volumetric ratio of 25 to 45% within the elastic high-molecular material.

In the present invention, large numbers of dots composed of an electrically insulating material are formed over one or both surfaces of an electrically conductive elastomer sheet, to form a unitary structure. The dots should preferably have a circular shape in plan view, but need not necessarily have such a circular shape. They need not necessarily have an oblong or trapezoidal shape in side view, but may have any shape depending upon the purpose. The dots should be formed as a unitary structure by a printing method; i.e. the dots should be transferred by printing.

The dots printed should: (1) have a good electrical insulation, i.e., should have a volume resistivity of at least $10^{10}$ ohm-cm, (2) be hardened by light, ultraviolet rays, heat, or should harden spontaneously, (3) be capable of being attached or melted onto the electrically conductive elastomer sheet, and (4) have a good durability, i.e., should develop little compression set and have a large elasticity.

Since silicone rubber is preferably used as the electrically conductive elastomer sheet according to the present invention, the material forming the dots should most preferably be an ink of the silicone elastomer or silicon resin type, in view of the above requirements (1) to (4). A silicone-type material is excellent since it responds well to the compressive deformation caused by pressure which is applied repetitively, and it does not permanently distort very much.

The material of the dots should have the following properties:

| | |
|---|---|
| Compression set (70° C. × 22 hrs) | 20% or less |
| Hardness (JIS A) | 40 to 90 |
| Tensile strength (kg/cm$^2$) | 50 or more |
| Elongation (%) | 50 to 300 |

When printing the dots, small quantities of the ink must be precisely applied onto very fine portions. For this purpose, therefore, screen printing is recommended. It is, however, also possible to employ thermograpy or a method of applying or spraying the ink onto a substrate (aluminium plate) of a thickness equal to that of the dots, on which the dot pattern is formed by chemical etching.

The distance between the dots, the diameter of the dots and their thickness may vary depending upon the size of the corresponding electrode plate and the thickness of the electrically conductive elastomer sheet. Generally, however, the dots have a diameter R (hereinafter referred to as the dot diameter) of 0.3 to 1.5 mm, preferably 0.4 to 1.0 mm; and a thickness of 0.01 to 0.10 mm, preferably 0.02 to 0.06 mm. If the distance between the centers of neighboring dots (hereinafter referred to as the pitch) is denoted by l, the spacing between neighboring dots (shortest distance between dots) l-R is between 0.1 to 3.0 mm, preferably between 0.2 to 2.9 mm. If the gap l-R is less than 0.1 mm, the sheet must be pressed with a very large force to make it conductive, which does not make it suitable for use as a switching element. If the gap l-R exceeds 3.0 mm, on the other hand, the electrically conductive elastomer sheet comes into contact with the electrode plate even when no pressure is exerted, and electric current leaks.

When the diameter R of the dots attached to the electrically conductive elastomer sheet is less than 0.3 mm, it is difficult to make the dots thick, the electric current leaks even when no pressure is exerted. If the dot diameter R exceeds 1.5 mm, on the other hand, the sheet must be pressed with a large force to make it conductive, and if the end of the pressure rod (stylus) used has a diameter of less than 2 mm, the force required to make the sheet conductive varies depending upon the area pressed, i.e., a very large pressure must be exerted on some portions of the sheet and a very small pressure on other portions.

Even when the pitch and dot diameter satisfy these conditions, the sheet will be made conductive with even a small pressure if the thickness d of dots is less than 0.01 mm, which could mean that the electrically conductive sheet comes into contact with the electrode plate even when it is not pressed, giving rise to leakage currents. When the thickness d of dots exceeds 0.10 mm, the sheet must be pressed with a very large force when a stylus is used, to make it conductive, so that this sheet is also not suitable for use as a switching element.

Pressure can be exerted on the sheet, not only by a pressure rod (stylus), but also by touching it with a finger. In this case, it is preferable to select the pitch l to be between about 2.0 to about 3.0 mm. It is also possible to change the level at which the switch is turned on or off, i.e., increase the resistance under ordinary conditions.

By suitably selecting the pitch, dot diameter and thickness in this way, it is possible to obtain a desired pressure for turning the switch on. When electrically conductive metal particles are used, the resistance changes greatly when the sheet is compressed, so that the resistance can be reduced. When a carbonaceous compound such as graphite is used the resistance remains relatively large when the sheet is compressed, but in the method of the present invention, however, the resistance changes so much that there is no problem from the practical point of view. When the thickness of the electrically conductive elastomer sheet is increased, a large pressure is required to make it conductive, but its durability increases. The thickness of the sheet durability increases. The thickness of the sheet therefore should be between 0.5 to 1.0 mm.

The form of the pressure-sensitive, electrically conductive composite sheet of the present invention will be explained below with reference to the drawings.

Figure 2:
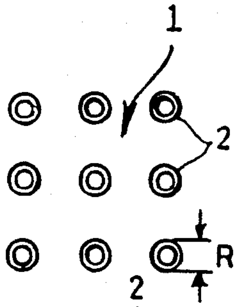
Figure 2:
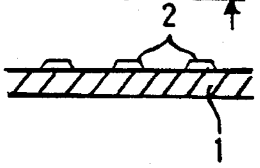

FIGS. 1(*a*) and 1(*b*) illustrate one embodiment of the present invention, wherein FIG. 1(*a*) is a plan view, and FIG. 1(*b*) is a sectioned side view. In the drawings, dots 2 are formed on the upper surface of an electrically conductive elastomer sheet 1, combined therewith. The character R denotes the diameter of the dots 2, l the distance (pitch) between the centers of neighboring dots, and d the thickness of the dots 2. FIGS. 2(*a*) and 2(*b*) illustrate another embodiment in which the dots 2 have a trapezoidal cross-section.

Figure 3:
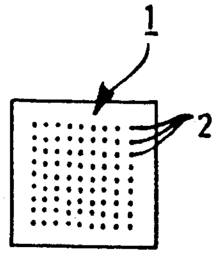
Figure 4:
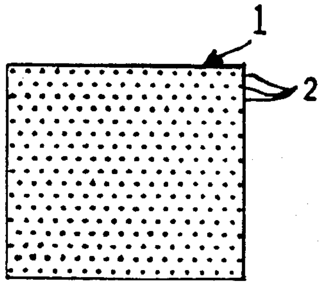

FIGS. 3 and 4 illustrate dot patterns according to the present invention, wherein FIG. 3 illustrates a rectangular grid pattern, and FIG. 4 a crosshatched pattern. The pattern of FIG. 4 is preferable because its dots will not fall into the gaps in comb electrodes.

The effects of the present invention will be described below by way of working examples.

Examples 1, 2 and Comparative Examples 1 to 5

100 parts weight of a silicone rubber was blended with 3.4 parts by weight dicumyl peroxide and 500 parts by weight nickel powder, and another 100 parts by weight of the silicone rubber was blended with 3.4 parts by weight dicumyl peroxide and 100 parts by weight graphite. Sheets of a thickness of 0.5 mm were prepared by press cross-linking to obtain the following samples (the dicumyl peroxide was C-3 manufactured by Shinetsu Kagaku Co.):

A. . . The sheet alone was used.

B. . . A perforated film barrier with a pore diameter of 6 mm and a thickness of 0.2 mm was inserted between the lower surface of the sheet and the electrode.

C. . . The dot pattern of FIG. 3 was printed in silicone resin onto the upper surface of the sheet with R=0.5 mm, d=0.02 mm, and l=2.0 mm.

D. . . A mechanical force was exerted on sheet A from the external side to separate the electrically conductive particles from one another, and impart a pressure sensitivity.

Figure 5:
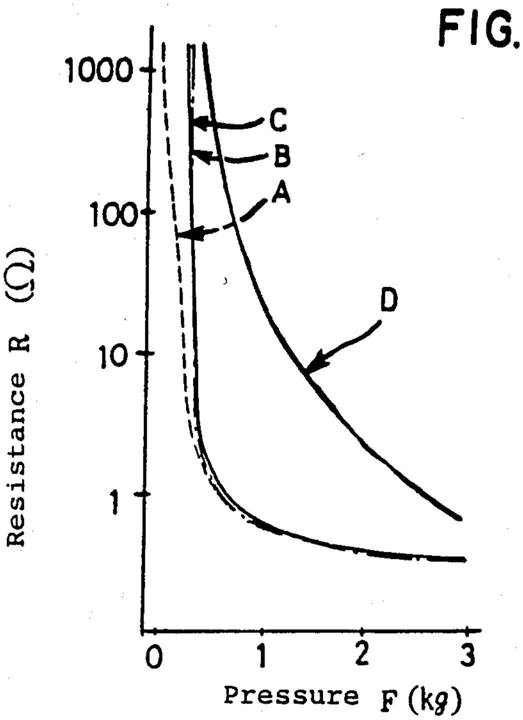
FIGS. 5 and 9 are graphs showing the characteristics provided by the present invention.
Figure 6:
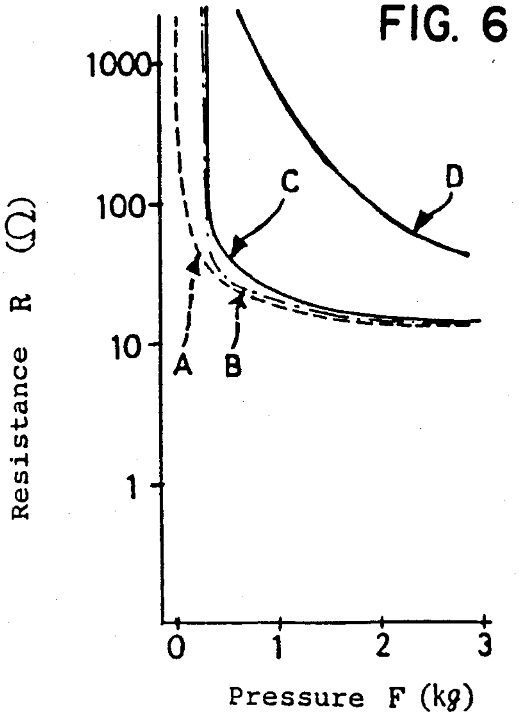

The sheets A to D were tested for pressure sensitivity, and the results obtained are shown in FIG. 5 (nickel type) and in FIG. 6 (graphite type). Changes in resistance that correspond to the changes in voltage were measured while a constant current of 1 mA was flowing, and a pressure which increased to a maximum of 3 kg was exerted by a pressure rod with a spherical end of 4 mm in diameter.

As will be understood from FIGS. 5 and 6, in the electrically conductive elastomer sheet A without a barrier layer, the resistance decreases and electric current leaks even when no pressure is exerted. With the sheets B and C, on the other hand, the electric current first starts to flow when they compressed, the sheets B and C exhibit nearly the same relationship between pressure and resistance. The conventional pressure-sensitive rubber sheet D exhibits a slight change in resistance corresponding to the pressure, and the resistance is generally large. This pressure-sensitive rubber sheet D therefore is not suited for use as a switching element. On the other hand, the sheets B, C exhibit a large change in resistance, or a high pressure sensitivity, which is a favorable characteristic for a switching element.

Using the sheets A to D, the pressure F was measured when a resistance of 1 kΩ was achieved and a pressure F which increased to a maximum of 500 g was exerted repeatedly until no conductivity was obtained, to measure the durability. The sheets A to D were also measured for chattering, the phenomenon by which the resistance varies rapidly about the value of 1 kΩ which is the level of discrimination, so that the circuit is turned on and off several times when it is pressed once, a process during which the resistance should decrease from the insultaing condition to the conductive condition upon the applicaiton of pressure. The results are shown in Table 1.

The measurement conditions were as follows:

Constant voltage:
: 5 volts, series resistance 1 kΩ.

Pressure:
: A sinusoidal half-wave produced by a pulse oscillator.

Pressure rod:
: Cylindrical rod 3 mm in diameter.

Maximum pressure:
: 500 g (7.07 kg/cm$^2$)

Electrode:
: Comb electrode (width of conductor 0.35 mm, gap 0.55 mm, flash-plated with gold).

TABLE 1

| | Sheet type | F (g) | Durability (× $10^3$) | Chattering |
|---|---|---|---|---|
| Comparative Example 1 | FIG. 5A | 50–200 | 20 | Occasional |
| Comparative Example 2 | FIG. 5D | 400–500 | 10 | Frequent |
| Comparative Example 3 | FIG. 5B | 180–260 | 50 | Almost none |
| Comparative Example 4 | FIG. 6D | More than 500 | Not measurable | Not clear |
| Comparative Example 5 | FIG. 6B | 100–150 | More than 1000 | Almost none |
| Example 1 | FIG. 5C | 40–100 | 60 | Almost none |
| Example 2 | FIG. 6C | 30–80 | More than 1000 | None |

From the results of Table 1, it can be understood that the electrically conductive rubber sheet of the nickel type with dots (Example 1) exhibits a reduced chattering compared with the conventional nickel-type sheets (Comparative Example 1, 2), and also exhibits an increased durability. The sheet of Examples 1 also exhibits a durability comparable to that of sheet B provided with a perforated film barrier (Comparative Example 3,but is free from the defects of the sheet employing the perforated film barrier. The sheet of the graphite type (Example 2) exhibits a durability which is strikingly more than that of the nickel-type sheet (Example 1).

Examples 2 to 11 and Comparative Examples 6 to 12

Figure 7:
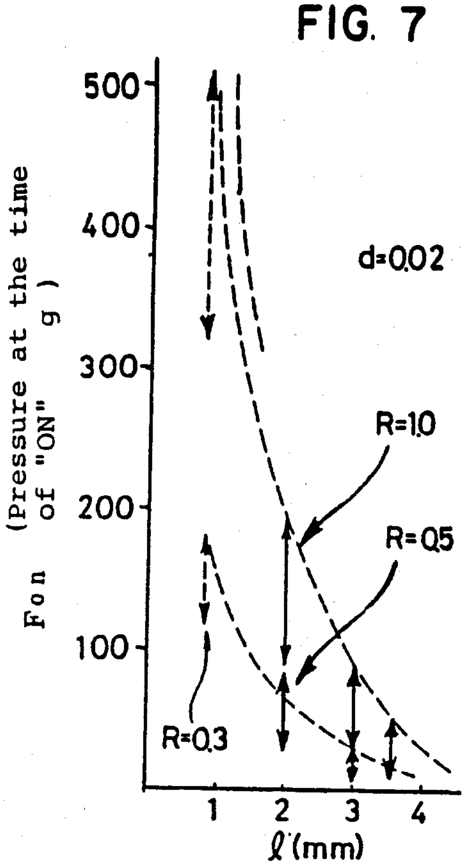
Figure 8:
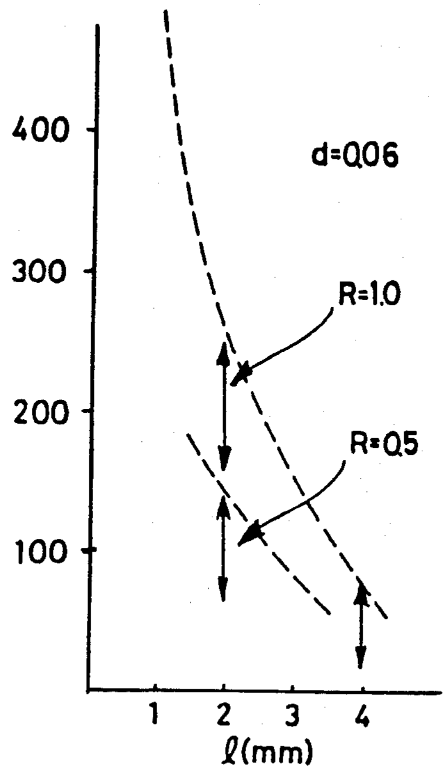
Figure 9:
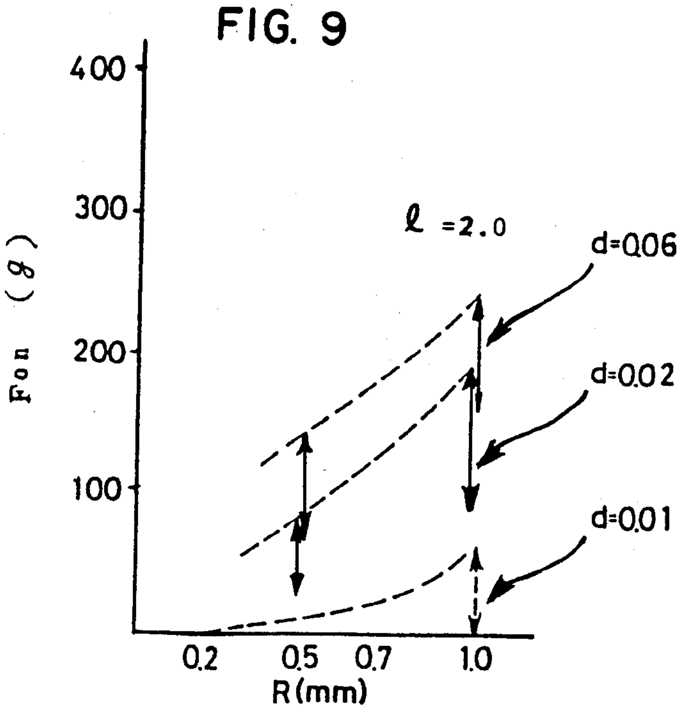

Dots of a variety of sizes were formed on electrically conductive elastomer sheets identical to that used in Example 2, to measure the pressure F, development of leakage, and chattering in the same manner as those of Table 1. The results are shown in Table 2. The relationship between the pitch l and the pressure F when the dot thickness d is maintained constant is shown in FIGS. 7 and 8, and the relationship between the dot diameter R and the pressure F when the pitch l is maintained constant is shown in FIG. 9.

(Example 8) without developing any current leakage or chattering. If the dot thickness exceeds 0.10 mm (Comparative Example 11), however, the switch is turned on with a pressure which varies greatly, and chattering develops.

In Comparative Example 12 in which the pitch is 4.5 mm and the spacing between dots l−R is greater than 3.0 mm, the switch is turned on with a pressure of between 0 to 60 g, even though the dot thickness is 0.10 mm, and current leaks easily.

Example 11 is the case when the pattern of FIG. 4 is formed by printing.

As described above, the pressure-sensitive, electrically conductive composite sheet of the present invention comprises an electrically conductive elastomer sheet obtained by dispersing electrically conductive particles in an elastic high-molecular material, and forming a pattern of dots composed of an electrically insulating material integrally over at least one surface of the electrically conductive elastomer sheet, the dot pattern having such a form that the dot diameter R is between 0.3 to 1.5 mm, the dot thickness d is between 0.01 to 0.10 mm, and the distance between the centers of neighboring dots l is (0.1 to 3.0) + R. The pressure-sensitive, electrically conductive composite sheet therefore provides the following advantages:

TABLE 2

| | Dot pitch l mm | Dot diameter R mm | Spacing between dots (l − R) mm | Dot thickness d mm | Diameter of pressure rod mm | Pressure at which switch on is turned $F_{ON}$ (g) | Leakage of current | Chattering |
|---|---|---|---|---|---|---|---|---|
| Comparative Example 8 | 0.8 | 0.7 | <0.1 | 0.02 | 3.0 | 320~500 | None | Occasional |
| Example 3 | 0.8 | 0.3 | 0.5 | 0.02 | 3.0 | 120~180 | None | None |
| Example 4 | 2.0 | 1.0 | 1.0 | 0.02 | 3.0 | 90~190 | None | None |
| Example 2 | 2.0 | 0.5 | 1.5 | 0.02 | 3.0 | 30~80 | None | None |
| Example 5 | 3.0 | 1.0 | 2.0 | 0.02 | 3.0 | 30~90 | None | None |
| Example 6 | 3.0 | 0.3 | 2.7 | 0.02 | 3.0 | 10~30 | None | None |
| Example 7 | 3.5 | 1.0 | 2.5 | 0.02 | 3.0 | 10~50 | None | None |
| Comparative Example 6 | 3.5 | 0.3 | 3.2 | 0.02 | 3.0 | 0 | Frequent | None |
| Comparative Example 7 | 2.0 | 0.2 | 1.8 | <0.01 | 3.0 | 0 | Frequent | None |
| Comparative Example 9 | 2.0 | 1.6 | 0.4 | 0.02 | 2.0 | 270~500 | None | Hardy any |
| Comparative Example 10 | 2.0 | 1.0 | 1.0 | <0.01 | 3.0 | 0~60 | Frequent | None |
| Example 8 | 2.0 | 1.0 | 1.0 | 0.06 | 3.0 | 160~240 | None | None |
| Example 9 | 2.0 | 0.5 | 1.5 | 0.06 | 3.0 | 70~140 | None | None |
| Example 10 | 4.0 | 1.0 | 3.0 | 0.06 | 3.0 | 20~80 | None | None |
| Comparative Example 11 | 4.0 | 1.0 | 3.0 | >0.10 | 3.0 | 150~500 | None | Hardy any |
| Comparative Example 12 | 4.5 | 1.0 | 3.5 | 0.10 | 3.0 | 0~60 | Occasional | None |
| Example 11 | 2.0 | 1.0 | 1.0 | 0.06 | 3.0 | 180~250 | None | None |

In general, an increased pressure is required to turn the switch on as the distance l−R between the dots decreases. When the distance l−R between the dots is less than 0.1 mm, as in Comprative Example 8, the switch is not turned on unless a very large pressure is exerted, and so this sheet is not practicable. When the distance l−R between the dots is greater than 3.0 mm, as in Comparative Example 6, on the other hand, the switch is turned on with a pressure of almost zero, so that current leaks readily even when the switch is not wanted on, i.e., even when no pressure is applied.

Comparative Example 7 is the case in which dots of a diameter of less than 0.3 mm are attached to the electrically conductive elastomer sheet. It is difficult to make thick dots having a diameter of, for example, 0.2 mm. When the thickness is as small as 0.01 mm, electric current leaks even when no pressure is exerted. When the dot diameter is greater than 1.5 mm, on the other hand, the pressure which turns the swtich on, when using a pressure bar with an end 2 mm in diameter, depends on where the bar is pressed. (Comparative Example 9).

In Comparative Example 10, even when the spacing l−R between the dots is appropriately selected, leakage develops when the dot thickness is less than 0.01 mm, and the switch can be turned on with zero pressure. As the dot thickness increases, the switch can be turned on with a suitable pressure up to a dot thickness of 0.06 mm (1) Since the dots are formed as a unitary structure, the barrier layer does not slip.

(2) The pressure sensitivity can be selected as required by adjusting the size of the dots, the form of the pattern, and the pitch.

(3) When compressed, the sheet exhibits a resistance that is comparable to its resistance when there are no dots.

(4) The sheet exhibits a large change in resistance when it is compressed, this makes it possible to obtain an on/off mechanism of a high sensitivity.

(5) By forming the dot pattern by, for example, a printing method, it is possible to impart a uniform pressure sensitivity while maintaining a high accuracy.

The pressure-sensitive, electrically conductive composite sheet of the present invention can be extensively used as elements for keyboard switches, push-button switches, explosion-resistant switches, and the like.

What is claimed is:

1. A pressure-sensitive, electrically conductive composite sheet which comprises an electrically conductive elastomer sheet obtained by dispersing electrically conductive particles in an elastomer high-molecular weight material; a dot pattern disposed over at least one surface of said electrically conductive elastomer sheet, said dot pattern being composed of an electrically insulating material and having the following requirements:

| | |
|---|---|
| Diameter of dots | R = 0.3 to 1.5 mm |
| Thickness of dots | d = 0.01 to 0.10 mm |
| Distance between centers of neighboring dots | l = (0.1 to 3.0) + R |

* * * * *